(12) United States Patent
Tang

(10) Patent No.: US 10,833,807 B2
(45) Date of Patent: Nov. 10, 2020

(54) PROCESSING METHOD UNDER DATA DUPLICATION AND RELATED DEVICES

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/465,894

(22) PCT Filed: Nov. 10, 2017

(86) PCT No.: PCT/CN2017/110557
§ 371 (c)(1),
(2) Date: May 31, 2019

(87) PCT Pub. No.: WO2019/090730
PCT Pub. Date: May 16, 2019

(65) Prior Publication Data
US 2019/0305891 A1 Oct. 3, 2019

(51) Int. Cl.
*H04L 1/08* (2006.01)
*H04L 1/18* (2006.01)
(Continued)

(52) U.S. Cl.
CPC .............. *H04L 1/08* (2013.01); *H04L 1/1812* (2013.01); *H04L 5/00* (2013.01); *H04W 4/00* (2013.01)

(58) Field of Classification Search
None
See application file for complete search history.

(56) References Cited

U.S. PATENT DOCUMENTS 8,605,674 B2 12/2013 Park et al.
2013/0215862 A1* 8/2013 Suzuki .................. H04W 76/27
370/329

(Continued)

FOREIGN PATENT DOCUMENTS

CN 101389119 A 3/2009
CN 104935413 A 9/2015

(Continued)

OTHER PUBLICATIONS

Extended Search Report for EP Application No. 17931391.1 dated Dec. 17, 2019.

(Continued)

*Primary Examiner* — Edan Orgad
*Assistant Examiner* — Emmanuel K Maglo

(57) ABSTRACT

A processing method under data duplication and related devices are provided, which are applied to a communication system. The communication system comprises a first communication device, and the first communication device comprises a PDCP entity. The method comprises: when data duplication is enabled, the PDCP entity of the first communication device duplicates target data, and the target data do not comprise data of which transmission have been completed and/or data that are being transmitted; and the PDCP entity of the first communication device delivers the duplicated target data to the RLC entity.

14 Claims, 8 Drawing Sheets

(51) Int. Cl.
*H04W 4/00* (2018.01)
*H04L 5/00* (2006.01)

(56) References Cited

U.S. PATENT DOCUMENTS

| | | | | |
|---|---|---|---|---|
| 2014/0056243 | A1* | 2/2014 | Pelletier | H04W 72/1268 |
| | | | | 370/329 |
| 2015/0003329 | A1* | 1/2015 | Morita | H04W 76/15 |
| | | | | 370/328 |
| 2016/0157095 | A1* | 6/2016 | Zhang | H04W 72/12 |
| | | | | 380/273 |
| 2017/0332435 | A1* | 11/2017 | Tenny | H04W 76/10 |
| 2018/0191479 | A1* | 7/2018 | Baek | H04L 1/1841 |
| 2018/0310202 | A1* | 10/2018 | Lohr | H04L 1/1874 |

FOREIGN PATENT DOCUMENTS

| | | |
|---|---|---|
| CN | 106031292 A | 10/2016 |
| CN | 106664245 A | 5/2017 |
| WO | 2016082386 A1 | 6/2016 |

OTHER PUBLICATIONS

3GPP TSG-RAN WG2 NR Ad Hoc; R2-1706483; Qingdao, China, Jun. 27-29, 2017.
3GPP TSG RAN WG2 Meeting #98; R2-1704836; Hangzhou, China, May 15-19, 2017.
English translation of China Office Action for CN Application 201780050610.4 dated Jun. 2, 2020.
3GPP TSG-RAN WG3 Meeting #97bis R3-173639; Prague, Czech Republic, Oct. 9-13, 2017.

* cited by examiner

DL DC duplication

PROCESSING METHOD UNDER DATA DUPLICATION AND RELATED DEVICES

CROSS-REFERENCE TO RELATED APPLICATION(S)

This application is a 371 application of International Application No. PCT/CN2017/110557, filed on Nov. 10, 2017, the entire disclosure of which is hereby incorporated by reference.

TECHNICAL FIELD

The present application relates to the technical field of communications, in particular to a processing method under data duplication and related devices.

BACKGROUND

In carrier aggregation (CA) and dual connectivity (DC), data duplication transmission utilizes a data duplication function of a Packet Data Convergence Protocol (PDCP) entity. First, a PDCP Protocol Data Unit (PDU) is duplicated into two same PDCP PDUs in the PDCP entity, for example, one is a PDCP PDU, and the other is a duplicated PDCP PDU. Then the PDCP entity transmits the two PDCP PDUs to two Radio Link Control (RLC) entities respectively, that is, transmits the two PDCP PDUs to two different logical channels to ensure that the two PDCP PDUs can be transmitted on different physical layer aggregated carriers.

SUMMARY

Implementations of the present application provide a processing method under data duplication and related devices, which are used for avoiding retransmission of data which have been transmitted earlier under the data duplication.

In a first aspect, an implementation of the present application provides a processing method under data duplication, applied to a communication system. The communication system includes a first communication device, and the first communication device includes a packet data convergence protocol (PDCP) entity. The method includes: when data duplication is enabled, the PDCP entity of the first communication device duplicates target data, and the target data do not include data of which transmission has been completed and/or data that are being transmitted; and the PDCP entity of the first communication device delivers the duplicated target data to a Radio Link Control (RLC) entity.

In a second aspect, an implementation of the present application provides a communication device, applied to a communication system. The communication system includes a first communication device, the communication device is the first communication device, the first communication device includes a packet data convergence protocol (PDCP) entity, and the first communication device further includes a processing unit.

The processing unit is used for duplicating target data through the PDCP entity when data duplication is enabled, the target data do not include data of which transmission has been completed and/or data that are being transmitted; and delivering duplicated target data to a radio link control (RLC) entity through the PDCP entity.

In a third aspect, an implementation of the present application provides a communication device including one or more processors, one or more storages, one or more transceivers, and one or more programs. The one or more programs are stored in the one or more storages and configured to be executed by the one or more processors. The one or more programs include instructions for executing acts in the method as described in the first aspect.

In a fourth aspect, an implementation of the present application provides a computer readable storage medium storing a computer program for electronic data interchange. The computer program causes a computer to execute parts or all of the acts described in the method of the first aspect.

In a fifth aspect, an implementation of the present application provides a computer program product. The computer program includes a non-transitory computer readable storage medium storing a computer program, and the computer program is operable to cause a computer to execute parts or all of the acts described in the method of the first aspect. The computer program product may be a software installation package.

These aspects and other aspects of the present application will be more simply understood in following description of the implementations.

BRIEF DESCRIPTION OF DRAWINGS

To more clearly explain the technical solutions in implementations or the background technology of the present application, the following will explain the drawings needed in the implementations or the background technology of the present application.

DETAILED DESCRIPTION

Terminologies used in implementation sections of the present application are only for the purpose of explaining specific implementations of the present application, and are not intended to limit the present application.

The terms "first", "second", "third" and "fourth", or the like in the description, claims and drawings of the present application are used to distinguish different objects and not used to describe a specific order. Furthermore, the terms "includes" and "have" and any variations thereof are intended to cover non-exclusive inclusion.

Figure 1A:
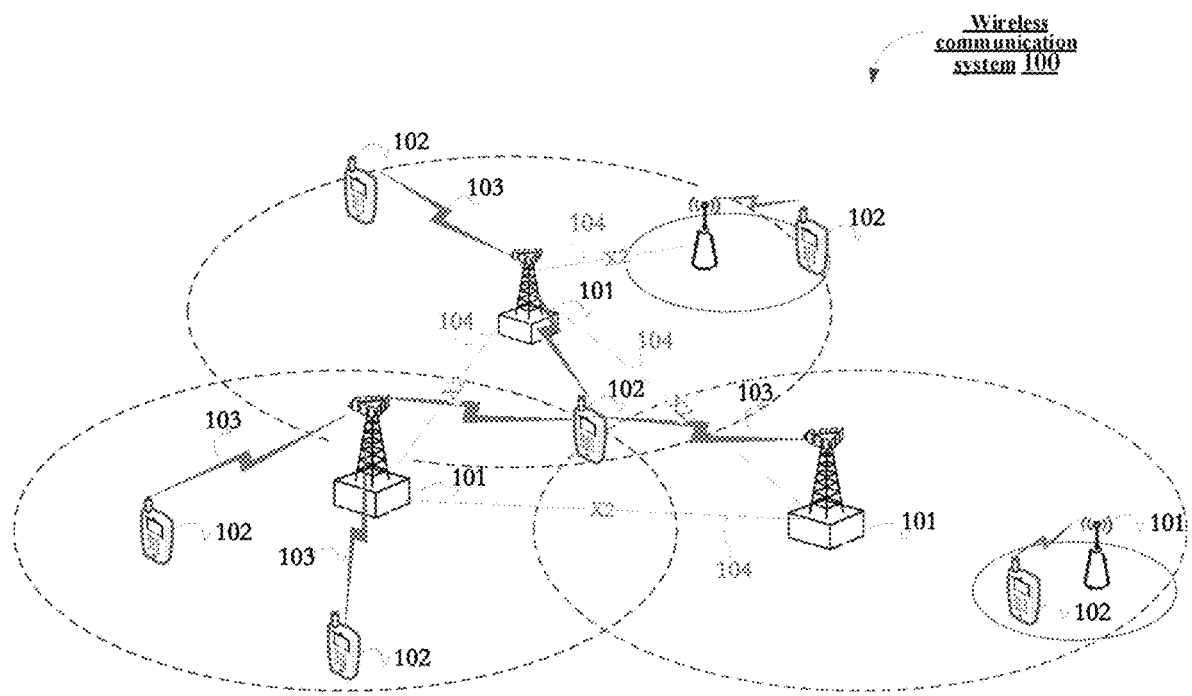
FIG. 1A is a schematic diagram of architecture of a wireless communication system involved in the present application.

FIG. 1A shows a wireless communication system involved in the present application. The wireless communication system is not limited to a Long Term Evolution (LTE) system, or may be a 5th Generation (5G) system evolved in the future, a New Radio (NR) system, a Machine to Machine (M2M) system, or the like. As shown in FIG. 1A, A wireless communication system 100 may include one or more network devices 101 and one or more pieces of user equipment 102. The network device 101 may be a base station, which may be used for communicating with one or more user equipment, or may be used for communicating with one or more base stations with partial functions of the user equipment (for example, communication between a macro base station and a micro base station, such as an access point). The base station may be a base transceiver station (BTS) in a time division synchronous code division multiple access (TD-SCDMA) system, or an evolutional node B (eNB) in an LTE system, or a base station in the 5G system or the NR system. In addition, the base station may also be an Access Point (AP), a transport point (TRP), a Central Unit (CU), or other network entities, and may include parts or all of functions of the above network entities.

The user equipment 102 may be distributed throughout the whole wireless communication system 100, and may be stationary, or mobile. In some implementations of the present application, the user equipment 102 may be a mobile device, a mobile station, a mobile unit, an M2M terminal, a wireless unit, a remote unit, a user agent, a mobile client, etc.

Specifically, the network device 101 may be used for communicating with the user equipment 102 through a wireless interface 103 under control of a network device controller (not shown). In some implementations, the network device controller may be a part of a core network, or may be integrated into the network device 101. The network device 101 and another network device 101 may also communicate with each other directly or indirectly through a backhaul interface 104 (e.g., an X2 interface).

Figure 1B:
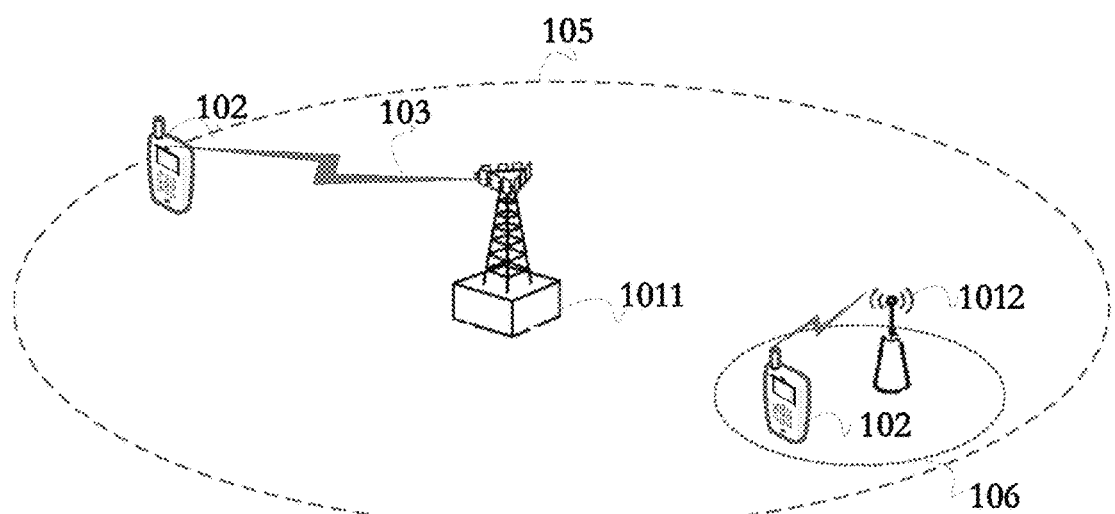
FIG. 1B is a schematic diagram of architecture of a dual connectivity network involved in the present application.

FIG. 1B is a schematic diagram of architecture of a dual connectivity network. As shown in FIG. 1B, a network device 1011 provides basic network coverage 105. A network device 1012 provides relatively small network coverage 106. User equipment (UE) 102 within common coverage of the network device 1011 and the network device 1012 will be capable of establishing communication connections with the network device 1011 and the network device 1012 at the same time. Here, a case in which the user equipment 102 has connections with the network device 1011 and the network device 1012 at the same time is referred to as dual connectivity. As shown in FIG. 1B, under the dual connectivity, the network device 1011 is a master node (MN), and the network device 1012 is a slave node (SN).

A working mode in which a plurality of continuous or discontinuous carriers are aggregated into a larger bandwidth, so that when the whole network resource is not fully occupied, a utilization rate of the whole network resource can be greatly improved, the user peak rate experience can be improved, and a utilization rate of a discrete spectrum can be improved, is called carrier aggregation (CA).

Figure 1C:
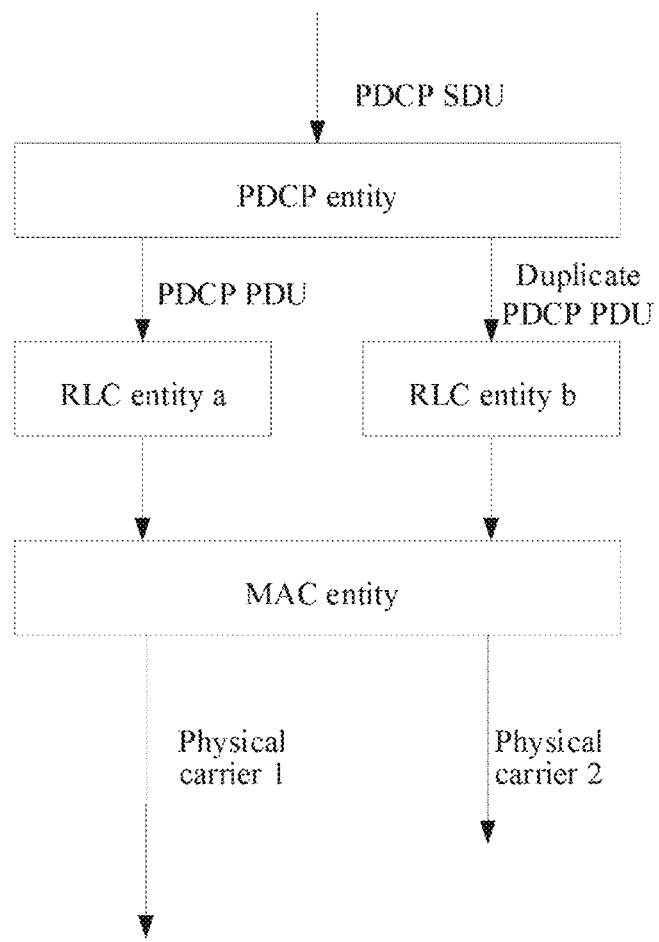
FIG. 1C is a schematic diagram of a protocol structure supporting data duplication under carrier aggregation (CA) involved in the present application.
Figure 1D:
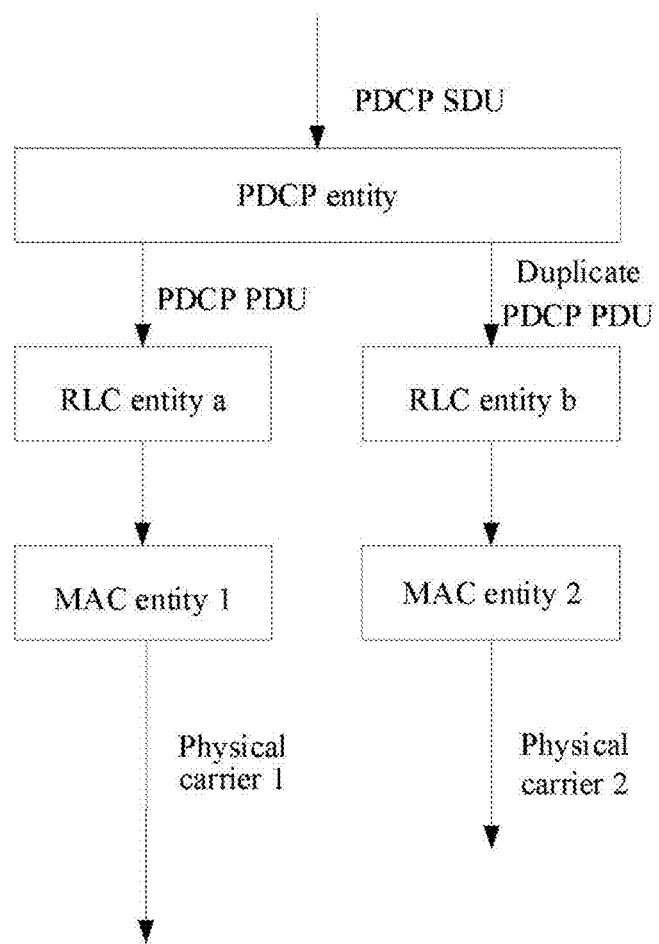
FIG. 1D is a schematic diagram of a protocol structure supporting data duplication under dual connectivity (DC) involved in the present application.

FIG. 1C shows a schematic diagram of a protocol structure supporting data duplication transmission under CA. As shown in FIG. 1C, an upper layer (i.e., Radio Resource Control (RRC)) of PDCP delivers a PDCP Service Data Unit (SDU) to a PDCP entity, and the PDCP entity uses a PDCP duplication function to duplicate data to obtain two same PDCP PDUs. Then the PDCP entity delivers the two PDCP PDUs to an RLC entity a and an RLC entity b respectively, and the RLC entities deliver the data to a lower layer to ensure that the two PDCP PDUs can be transmitted on different physical carriers, thereby achieving frequency diversity gain to improve data transmission reliability. FIG. 1D shows a schematic diagram of a protocol structure supporting data duplication transmission under DC. Compared with FIG. 1C, a protocol structure shown in FIG. 1D has two Media Access Control (MAC) entities. The data duplication transmission under the protocol structure shown in FIG. 1D is the same as the data duplication transmission under the protocol structure shown in FIG. 1C, and will not be described here.

Specifically, based on FIG. 1C, assuming that the RLC entity a is used for transmitting original data and the RLC entity b is used for transmitting duplicated data. In act 1, when data duplication is enabled, duplicated data X are being transmitted, and duplicated data Y are waiting for transmission. In act 2, when the duplicated data X are being transmitted and the duplicated data Y are still not transmitted, if the data duplication is disabled, the duplicated data Y may be cleared at this time. Since the duplicated data X are already in transmission, the duplicated data X will be retained. In act 3, when the duplicated data X are still being transmitted, if the data duplication is re-enabled, there is an issue, i.e., how to perform data processing at this time can avoid a problem of the sending of redundant data.

In the present application, when the data duplication changes from being disabled to being enabled, specific implementation of the PDCP entity may include the following policies.

When the data duplication changes from being disabled to being enabled, the PDCP entity changes from delivering data only to the RLC entity a to duplicating the data and delivering the data to the RLC entity a and RLC entity b. When the data duplication is enabled, in order to avoid the problem of the sending of redundant data, before the data are delivered to the RLC entity b, the PDCP entity needs to avoid duplicating the data that are being transmitted and the data of which transmission have already been completed.

It should be noted that the wireless communication system 100 shown in FIG. 1A is only for more clearly explaining the technical solutions of the present application, and does not constitute a limitation to the present application. Those of ordinary skill in the art should know that with evolution of network architecture and emergence of new service scenarios, the technical solutions provided by the present application are also applicable to similar technical problems.

Figure 2:
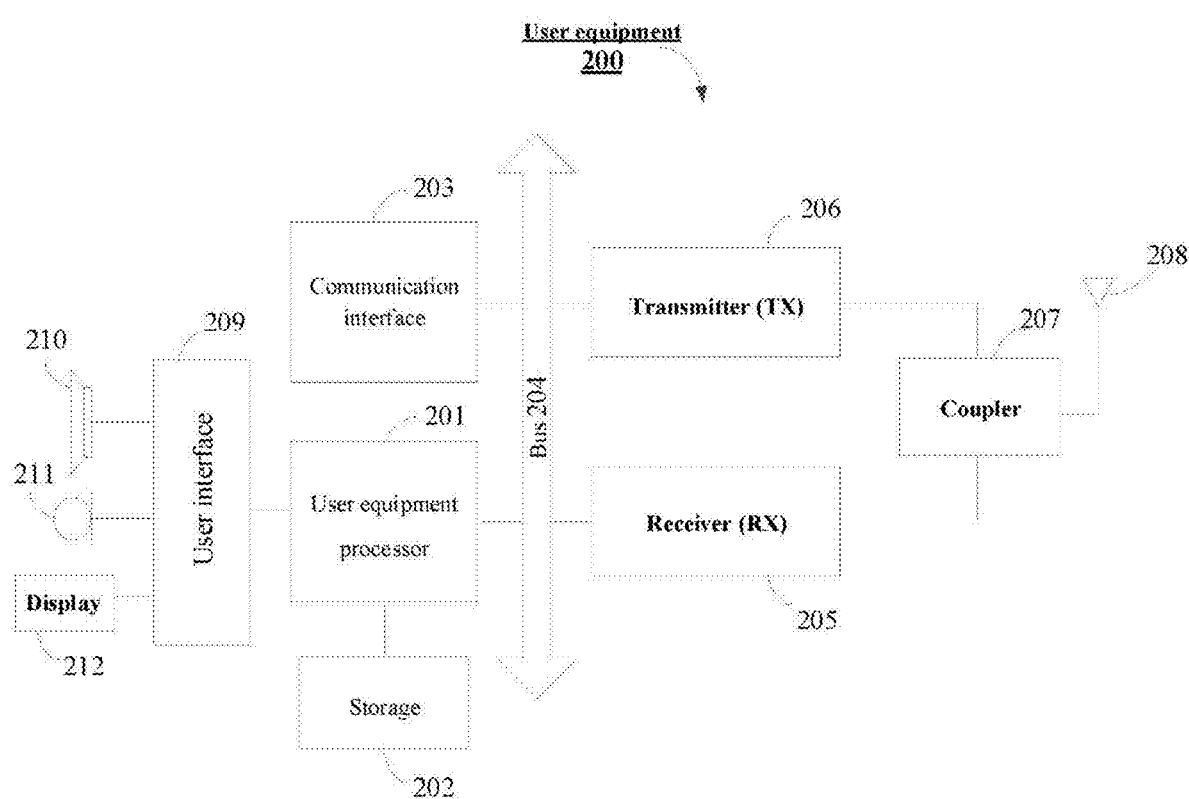
FIG. 2 is a schematic diagram of structure of user equipment according to an implementation of the present application.

Refer to FIG. 2, FIG. 2 shows user equipment 200 according to some implementations of the present application. As shown in FIG. 2, the user equipment 200 may include one or more user equipment processors 201, a storage 202, a communication interface 203, a receiver 205, a transmitter 206, a coupler 207, an antenna 208, a user interface 202, and input and output modules (including an audio input and output module 210, a key input module 211, a display 212, etc.). These components may be connected through a bus 204 or other modes, for example, in FIG. 2, the components are connected through the bus.

The communication interface 203 may be used for communication of the user equipment 200 with other communication devices, such as a network device. Specifically, the network device may be the network device 300 shown in FIG. 3. Specifically, the communication interface 203 may be a communication interface of LTE (4G), or may be a communication interface of the 5G or new radio in the future. Not limited to a wireless communication interface, the user equipment 200 may be configured with a wired communication interface 203, such as a Local Access Network (LAN) interface.

The transmitter 206 may be used for performing transmission processing on signals output by the user equipment processor 201, such as, signal modulation. The receiver 205 may be used for performing reception processing on mobile communication signals received by the antenna 208, such as, signal demodulation. In some implementations of the present application, the transmitter 206 and the receiver 205 may be considered as one wireless modem. In the user equipment 200, both the number of transmitters 206 and the number of receivers 205 may be one or more. The antenna 208 may be used for converting electromagnetic energy in a transmission line into electromagnetic waves in free space, or converting electromagnetic waves in the free space into electromagnetic energy in the transmission line. The coupler 207 is used for dividing the mobile communication signals received by the antenna 308 into multiple channels and distributing them to multiple receivers 205.

In addition to the transmitter 206 and receiver 205 shown in FIG. 2, the user equipment 200 may also include other communication components, such as, a GPS module, a Bluetooth module, a Wireless Fidelity (Wi-Fi) module, and the like. Not limited to the wireless communication signals described above, the user equipment 200 may also support other wireless communication signals, such as, satellite signals, short wave signals, and the like. Not limited to the wireless communication, the user equipment 200 may also be configured with a wired network interface (e.g., a LAN interface) to support wired communication.

The input and output module may be used for implementing an interaction between the user equipment 200 and a user/external environment. The input and output module may mainly include an audio input and output module 210, a key input module 211, and a display 212, etc. Specifically, the input and output module may further include a camera, a touch screen, and a sensor, etc. All input and output modules communicate with the user equipment processor 201 through the user interface 209.

The storage 202 is coupled to the user equipment processor 201, and used for storing various software programs and/or multiple sets of instructions. Specifically, the storage 202 may include a high-speed random access memory, or may include a non-volatile memory, such as, one or more disk storage devices, flash memory devices, or other non-volatile solid-state storage devices. The storage 202 may store an operating system (hereinafter referred to as a system), such as, an embedded operating system, e.g., ANDROID, IOS, WINDOWS, or LINUX. The storage 202 may also store a network communication program that may be used for communication among one or more additional devices, one or more user equipment, and one or more network devices. The storage 202 may also store a user interface program that may vividly display contents of application programs through a graphical operating interface, and receive user's control operations for the application programs through input controls, such as, a menu, a dialog box, a key, etc.

In some implementations of the present application, the storage 202 may be used for storing an implementation program at the user equipment 200 side for processing under data duplication provided by one or more implementations of the present application. An implementation of the processing method under the data duplication provided by one or more implementations of the present application is illustrated by referring to following method implementations.

In some implementations of the present application, the user equipment processor 201 may be used for reading and executing computer readable instructions. Specifically, the user equipment processor 201 may be used for calling a program stored in the storage 202, such as an implementation program at the user equipment 200 side of the processing method under the data duplication provided by one or more implementations of the present application, and executing instructions contained in the program.

It can be understood that the user equipment 200 may be implemented as a mobile device, a mobile station, a mobile unit, a wireless unit, a remote unit, a user agent, a mobile client, etc.

It should be noted that the user equipment 200 shown in FIG. 2 is only an implementation of the implementations of the present application. In actual application, the user equipment 200 may also include more or fewer components, which is not limited here.

Figure 3:
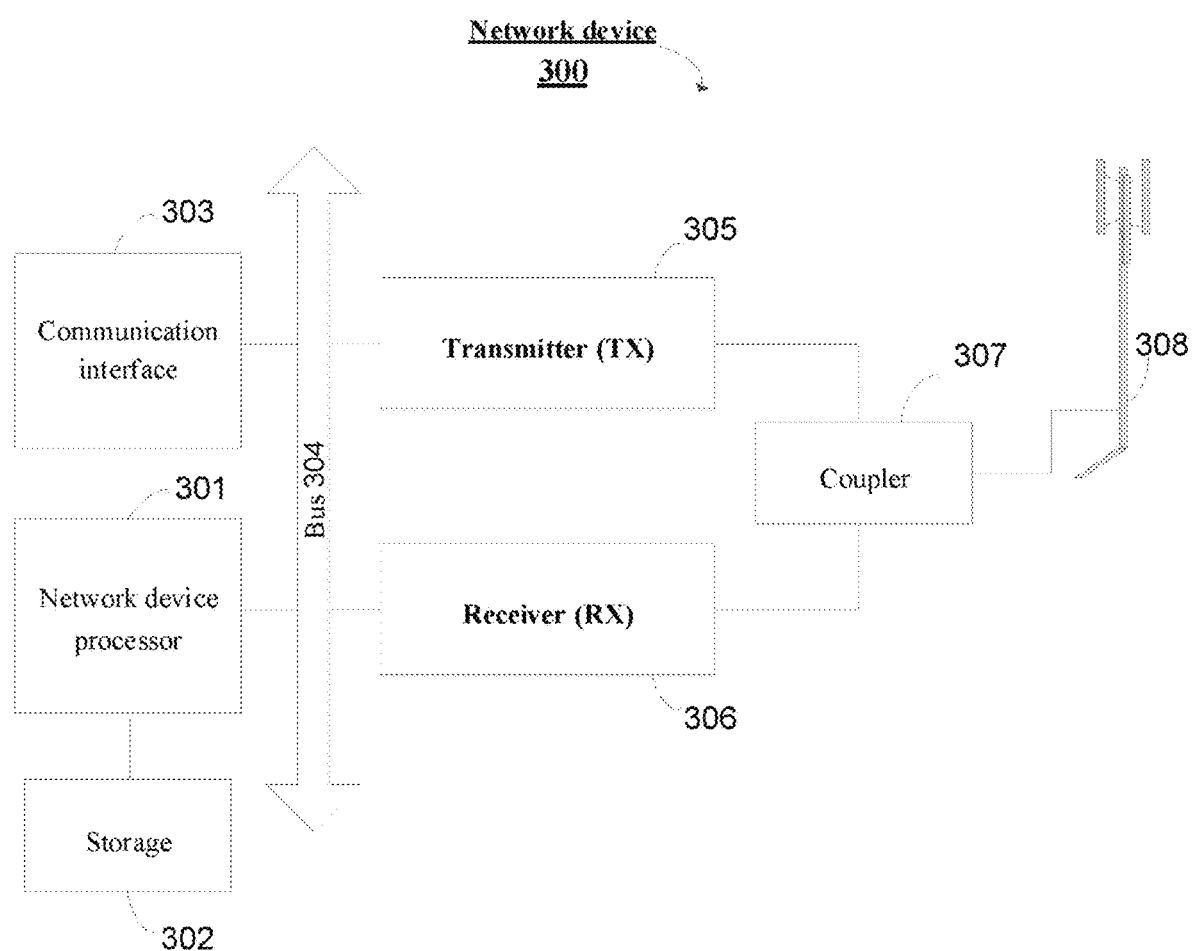
FIG. 3 is a schematic structural diagram of a network device provided by an implementation of the present application.

Refer to FIG. 3, FIG. 3 shows a network device 300 provided by some implementations of the present application. As shown in FIG. 3, the network device 300 may include one or more network device processors 301, a storage 302, a communication interface 303, a transmitter 305, a receiver 306, a coupler 307, and an antenna 308. These components may be connected through a bus 304 or other modes. For example, in FIG. 3 the components are connected through the bus.

The communication interface 303 may be used for communication of the network device 300 with other communication devices, such as, user equipment or other network devices. Specifically, the user equipment may be the user equipment 200 shown in FIG. 2. Specifically, the communication interface 303 may be a communication interface of LTE (4G), or may be a communication interface of 5G or new radio in the future. Not limited to the wireless communication interface, the network device 300 may be configured with a wired communication interface 303 to support wired communication. For example, backhaul links between one network device 300 and other network devices 300 may be wired communication connections.

The transmitter 305 may be used for performing transmission processing on signals output by the network device processor 301, such as, signal modulation. The receiver 306 may be used for performing reception processing on mobile communication signals received by the antenna 308, such as, signal demodulation. In some implementations of the present application, the transmitter 305 and the receiver 306 may be considered as one wireless modem. In the network device 300, both the number of transmitters 305 and the number of receivers 306 may be one or more. The antenna 308 may be used for converting electromagnetic energy in a transmission line into electromagnetic waves in free space, or to converting electromagnetic waves in the free space into electromagnetic energy in the transmission line. The coupler 307 is used for dividing the mobile communication signals into multiple channels and distributing them to multiple receivers 306.

The storage 302 is coupled to the network device processor 301, and used for storing various software programs and/or multiple sets of instructions. Specifically, the storage 302 may include a high-speed random access memory, or may include a non-volatile memory, such as, one or more disk storage devices, flash memory devices, or other non-volatile solid-state storage devices. The storage 302 may store an operating system (hereinafter referred to as a system), such as an embedded operating system, e.g., uCOS, VxWorks, or RTLinux. The storage 302 may also store a network communication program that may be used for communication among one or more additional devices, one or more terminal devices, and one or more network devices.

The network device processor 301 may be used for managing wireless channels, implementing calling and establishing and removing communication links, and providing cell handover control for users in a control area. Specifically, the network device processor 301 may include an Administration Module/Communication Module (AM/CM) (used as a center for voice path switch and information exchange), a Basic Module, BM) (used for completing call processing, signaling processing, Radio resource management, wireless link management and circuit maintenance functions), a Transcoder and Submultiplexer (TCSM) (used for completing multiplexing and demultiplexing and code transformation functions), etc.

In some implementations of the present application, the storage 302 may be used for storing an implementation program at a network device 300 side for the processing under the data duplication provided by one or more implementations of the present application. An implementation of the processing method under the data duplication provided by one or more implementations of the present application is illustrated by referring to following method implementations.

In implementations of the present application, the network device processor 301 may be used for reading and executing computer readable instructions. Specifically, the network device processor 301 may be used for calling a program stored in the storage 302, such as an implementation program at the network device 300 side of the processing method under the data duplication provided by one or more implementations of the present application, and executing instructions contained in the program.

It may be understood that the network device 300 may be implemented as a base transceiver station, a wireless transceiver, a basic service set (BSS), an extended service set (ESS), a NodeB, an eNodeB, an access point or a TRP, etc.

It should be noted that the network device 300 shown in FIG. 3 is only AN implementation of implementations of the present application. In actual application, the network device 300 may include more or fewer components, which is not limited here.

Based on the implementations respectively corresponding to the wireless communication system 100, the user equipment 200 and the network device 300, an implementation of the present application provides a processing method under data duplication.

Figure 4A:
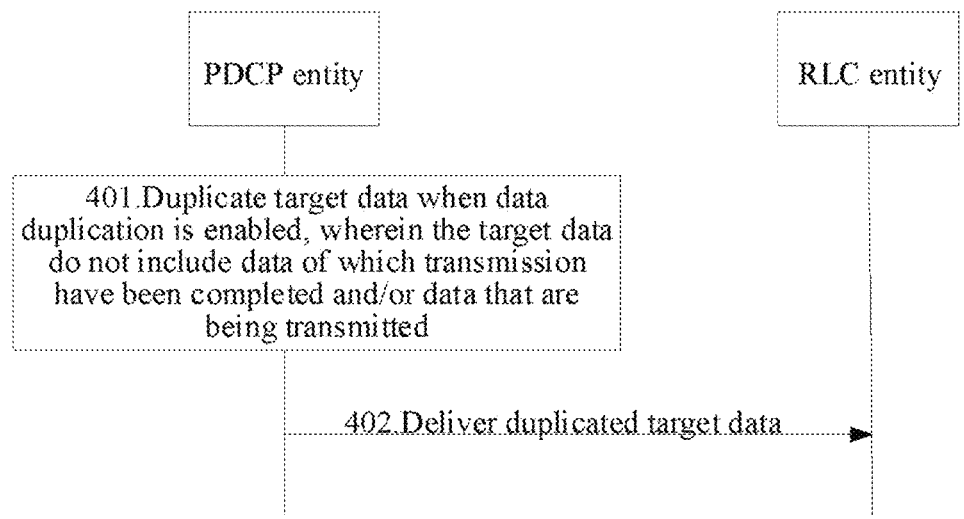
FIG. 4A is a flow chart of a processing method under data duplication involved in the present application.

Refer to FIG. 4A, FIG. 4A is a flow chart of a processing method under data duplication provided by an implementation of the present application. The method is applied to a communication system including a first communication device, and the first communication device includes a PDCP entity. The method includes the following acts.

In act 401, when data duplication is enabled, the PDCP entity of the first communication device duplicates target data, and the target data do not include data of which transmission have been completed and/or data that are being transmitted.

In act 402, the PDCP entity of the first communication device delivers duplicated target data to an RLC entity.

Further, duplicating, by the PDCP entity of the first communication device, target data is performed when the data duplication changes from being enabled to being disabled to being enabled.

Further, the target data include data delivered by an upper layer of the PDCP entity and received by the PDCP entity of the first communication device, wherein the data are not transmitted.

Further, whether the data duplication function of the device is disabled or enabled may be controlled by a MAC Control Element (CE). For example, for user equipment under DC, whether the data duplication of the user equipment is disabled or enabled may be controlled by a network device (such as MN or SN under DC) sending the MAC CE.

For example, based on FIG. 1C, assuming that the first communication device is initially in a data duplication enabled state, and under data duplication, a PDCP entity of the first communication device receives data delivered by an upper layer, if the data are data 1 and data 2, the PDCP entity of the first communication device performs the data duplication to obtain data 1, duplicated data 1, data 2 and duplicated data 2. The PDCP entity of the first communication device delivers the data 1 to the RLC entity a and duplicated data 1 to the RLC entity b, so that the RLC entities transmit the data to a lower layer, and the data 2 and duplicated data 2 are in a waiting transmission state. During transmission of the data 1 and duplicated data 1, if the data duplication of the first communication device is switched from the enabled state to a disabled state, since the data duplication function is disabled, the PDCP entity of the first communication device will clear the duplicated data 2 (it should be noted that when the duplicated data 2 is cleared, the duplicated data 2 may still be in the PDCP entity, or the duplicated data 2 has been delivered to the RLC entity by the PDCP entity), and since the duplicated data 1 already have been transmitting, the duplicated data 1 will be retained in the transmission state at this time. Since the duplicated data 1 are still in the transmission process, if the data duplication of the first communication device is quickly switched from the disabled state to the enabled state, then in the case, the PDCP entity of the first communication device in the present application does not duplicate the data of which transmission has been completed and/or the data that are being transmitted. Then the PDCP entity of the first communication device delivers the duplicated data to the RLC entity. That is, the PDCP entity of the first communication device only duplicates the data 2 and does not duplicate the data 1, and delivers the duplicated data to the RLC entity a and RLC entity b respectively.

It can be seen that in implementation of the present application, the PDCP entity of the device does not duplicate the data of which transmission has been completed and/or the data that are being transmitted when the data duplication changes from being enabled to being disabled to being enabled, thus avoiding retransmission of the data that were transmitted when the last data duplication was enabled, and avoiding the problem of the sending of redundant data.

It should be noted that the above examples are only used to explain an inventive principles of the present application and should not be construed as limitations.

In some implementations of the present application, when the first communication device includes user equipment, the user equipment further includes a first RLC entity and a second RLC entity. The first RLC entity is used for transmitting original data and the second RLC entity is used for transmitting duplicated data. A specific implementation for the PDCP entity of the first communication device to deliver the duplicated target data to the RLC entity is as follows: the PDCP entity of the user equipment delivers duplicated target data to the second RLC entity.

Figure 4B:
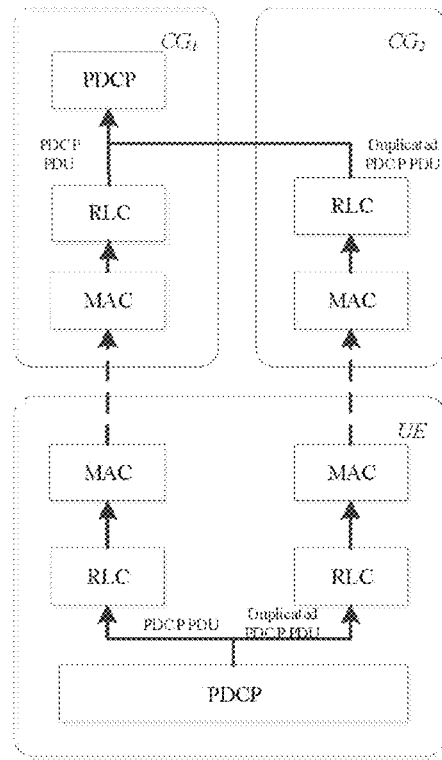
FIG. 4B is a schematic diagram of uplink data duplication transmission under DC involved in the present application.

For example, as shown in FIG. 4B, FIG. 4B shows a schematic diagram of uplink data duplication transmission under DC. As shown in FIG. 4B, user equipment (UE) at least includes one PDCP entity, two RLC entities and two MAC entities. Under the data duplication, the PDCP entity of the user equipment duplicates target data to obtain original target data and duplicated target data, then the PDCP entity of the user equipment respectively deliver the original target data and the duplicated target data to the two RLC entities of the user equipment, the two RLC entities of the user equipment respectively deliver the original target data and the duplicated target data to the two MAC entities of the user equipment, and the two MAC entities of the user equipment transmit the two data to two network devices through wireless interfaces. Finally the two data are aggregated at a PDCP entity of one of the network devices.

It should be noted that the examples are for explanation only and should not be construed as limitations.

In some implementations of the present application, the communication system further includes a second communication device, when the first communication device includes a first network device and the second communication device includes a second network device, the first network device further includes an RLC entity, the second network device includes an RLC entity, the RLC entity of the first network device is used for transmitting original data, the RLC entity of the second network device is used for transmitting duplicated data. A specific implementation for the PDCP entity of the first communication device delivering the duplicated target data to the RLC entity is as follows: the PDCP entity of the first network device delivers the duplicated target data to the RLC entity of the second network device.

Figure 4C:
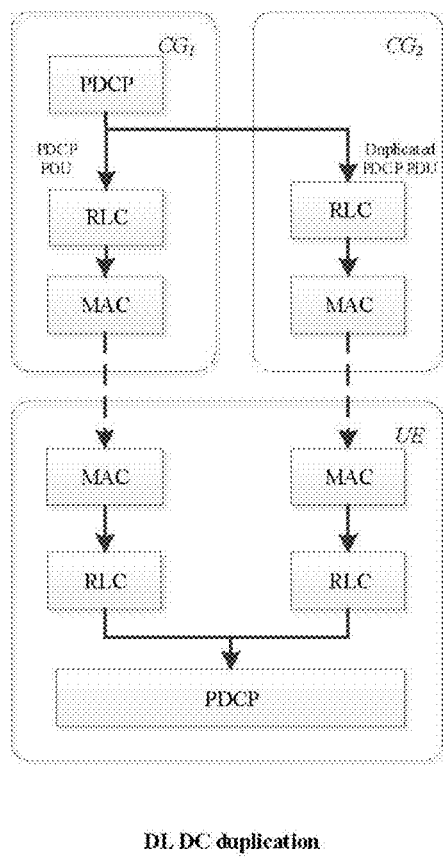
FIG. 4C is a schematic diagram of downlink data duplication transmission under DC involved in the present application.

For example, as shown in FIG. 4C, FIG. 4C shows a schematic diagram of downlink data duplication transmission under DC. As shown in FIG. 4C, a network device located in a cell group 1 (CG1) at least includes one PDCP entity, one RLC entity and one MAC entity, and a network device located in a CG2 at least includes one RLC entity and one MAC entity. Under data duplication, the PDCP entity of the network device located in the CG1 duplicates target data to obtain original target data and duplicated target data, and then the PDCP entity of the network device located in the CG1 delivers the original target data and the duplicated target data to its own RLC entity and the RLC entity of the network device located in CG2 respectively. The RLC entities of the two network devices respectively deliver the two data to their own MAC entities, and the MAC entities of the two network devices transmit the two data to user equipment through wireless interfaces. Finally the two data are aggregated at a PDCP entity of the user equipment.

It should be noted that the examples are for explanation only and should not be construed as limitations.

In some implementations of the present application, the above target data should have at least one of following data.

(1) The target data do not include data being in Automatic Repeat-reQuest (ARQ) transmission.

Specifically, the ARQ transmission is a transmission mechanism in which a receiver is required to confirm a correct transmission of previous data before sending an acknowledgement message to a sender, and the sender will send subsequent data until receiving the acknowledgement message.

For example, in a process of data duplication transmission from being enabled to being disabled to being re-enabled, when data duplication is in a first stage (enabled state), data transmitted by a sender include data 1 and duplicated data 1. When the data duplication is in a second stage (disabled state), the data 1 and duplicated data 1 are still in a transmission state. When the data duplication is in a third stage (re-enabled state), the duplicated data 1 are still in the transmission state. Under the ARQ transmission mechanism, since the receiver does not receive the duplicated data 1 correctly sent by the sender, the receiver does not send acknowledgement information to the sender. In this case, the sender may re-transmit the duplicated data 1 that are being transmitted, thus causing repeated sending of redundant data. Therefore, the data that are being in the ARQ transmission should avoid to be used as the target data in the present application.

(2) The target data do not include data of which at least one segment is being in an ARQ transmission.

Specifically, when a PDU or SDU is relatively large, the PDU or SDU will be transmitted in segments. At least one segment of data is being transmitted, which means that the data have not been transmitted completely.

For example, in a process of data duplication transmission from being enabled to being disabled to being re-enabled, when data duplication is in a first stage (enabled state), data transmitted by a sender include a certain segment or multiple segments of data 1, and a certain segment or multiple segments of duplicated data 1. When the data duplication is in a second stage (disabled state), the certain segment or multiple segments of the data 1 and the certain segment or multiple segments of the duplicated data 1 are still in a transmission state. When the data duplication is in a third stage (re-enabled state), the certain segment or multiple segments of the duplicated data 1 are still in the transmission state. Under an ARQ transmission mechanism, since a receiver does not completely receive the duplicated data 1 correctly sent by the sender, the receiver does not send acknowledgement information to the sender. In this case, the sender may re-transmit the duplicated data 1 of which at least one segment is being transmitted, thus causing repeated sending of redundant data. Therefore, the target data in the present application should avoid the data of which at least one segment is being in the ARQ transmission.

(3) The target data do not include data that are being in a Hybrid Automatic Repeat reQuest (HARD) transmission.

Specifically, the HARQ transmission is a transmission mechanism in which a receiver is required to confirm a correct transmission of previous data before sending an acknowledgement message to a sender, and the sender will send subsequent data until receiving the acknowledgement message. A main difference between HARQ and ARQ is that a forward error correction function is added in the HARQ. In the ARQ, the whole data are re-transmitted when an error is found. In the HARQ, a wrong part of the data is found out and then transmission is performed only for the wrong part. Similar to the case of above (1), reference may be made to the example described in above (1), and will not be described here.

(4) The target data do not include data of which at least one segment is being in an HARQ transmission. Similar to the case of above (2), reference may be made to the example described in above (2), and will not be described here.

(5) The target data do not include first data, and PDCP COUNT of the first data is less than or equal to PDCP COUNT of data being in an ARQ transmission.

Specifically, a COUNT value refers to a counter of PDCP data for security protection. The COUNT value consists of a hyper frame number (hfn) and a sequence number (PDCP SN) corresponding to data. When a PDCP entity delivers one PDCP data at each time, the PDCP COUNT value will be increased by 1. When a PDCP COUNT value of certain data is less than a PDCP COUNT value of data being in transmission, it indicates that the data have been delivered. When a PDCP COUNT value of certain data is equal to a PDCP COUNT value of the data being in transmission, it indicates that the data is being delivered. Therefore, in the present application, to avoid repeated sending of redundant data, under the ARQ transmission mechanism, this type of data should avoid to be used as the target data.

(6) The target data do not include second data, and PDCP COUNT of the second data is less than or equal to PDCP COUNT of data of which at least one segment is being in ARQ transmission.

Specifically, when a PDU or SDU is relatively large, the PDU or SDU will be transmitted in segments. At least one segment of certain data is being transmitted, which means that the data have not been transmitted completely. PDCP COUNT of different segments of the same data is the same. When a PDCP COUNT value of certain data is less than a PDCP COUNT value of data of which at least one segment is being in transmission, it indicates that the data have been delivered. When a PDCP COUNT value of certain data is equal to the PDCP COUNT value of the data of which at least one segment is being in transmission, it indicates that the data are being delivered. Therefore, in the present application, to avoid repeated sending of redundant data, under an ARQ transmission mechanism, this type of data should avoid to be used as the target data.

(7) The target data do not include third data, and PDCP COUNT of the third data is less than or equal to PDCP COUNT of data being in HARQ transmission. Similar to the case of above (5), reference may be made to the example described in above (5), and will not be described here.

(8) In some implementations of the present application, the target data do not include fourth data, and PDCP COUNT of the fourth data is less than or equal to PDCP COUNT of data of which at least one segment is being in HARQ transmission. Similar to the case of above (6), reference may be made to the example described in above (6), and will not be described here.

It should be noted that the examples are for explanation only and should not be construed as limitations.

Figure 5:
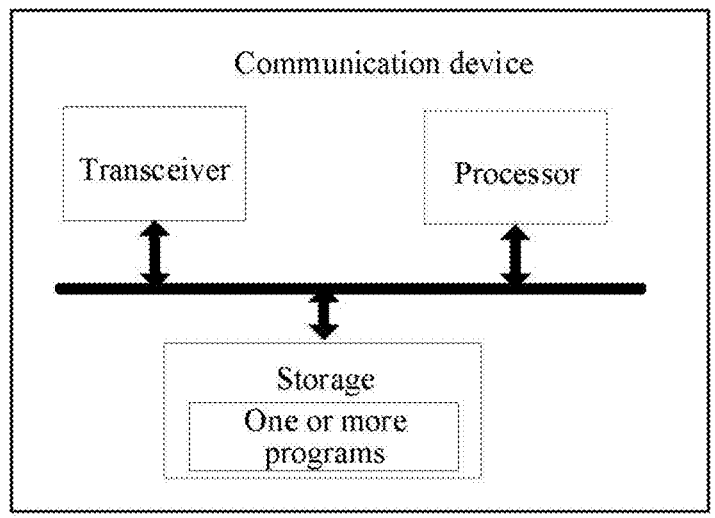
FIG. 5 is a schematic diagram of structure of a communication device according to an implementation of the present application.

Refer to FIG. 5, FIG. 5 shows a communication device 500 provided by an implementation of the present application. The communication device 500 may be user equipment, or a communication device. The communication device 500 is applied to a communication system. The communication system includes a first communication device. The communication device 500 is the first communication device, and the communication device 500 includes a PDCP entity, and the communication device 500 further includes one or more processors, one or more storages, one or more transceivers, and one or more programs. The one or more programs are stored in the one or more storages, and configured to be executed by the one or more processors. The program includes instructions for performing following acts: duplicating target data through the PDCP entity when data duplication is enabled, wherein the target data do not include data of which transmission has been completed and/or data that are being transmitted; and delivering duplicated target data to an RLC entity through the PDCP entity.

In some implementations of the present application, when the communication device includes user equipment, the user equipment further includes a first RLC entity and a second RLC entity, the first RLC entity is used for transmitting original data and the second RLC entity is used for transmitting duplicated data. In an aspect of delivering the duplicated target data to the RLC entity through the PDCP entity, the program includes instructions for specifically executing following acts: delivering the duplicated target data to the second RLC entity through the PDCP entity.

In some implementations of the present application, the communication system further includes a second communication device, when the first communication device includes a first network device and the second communication device includes a second network device, the first network device further includes an RLC entity, the second network device includes an RLC entity, the RLC entity of the first network device is used for transmitting original data, the RLC entity of the second network device is used for transmitting duplicated data. In an aspect of delivering the duplicated target data to the RLC entity through the PDCP entity, the program includes instructions for specifically executing following acts: delivering the duplicated target data to the RLC entity of the second network device through the PDCP entity.

In some implementations of the present application, the target data do not include data that are being in Automatic Repeat-reQuest (ARQ) transmission.

In some implementations of the present application, the target data do not include data which have at least one segment being in an ARQ transmission In some implementations of the present application, the target data do not include data that are being in Hybrid Automatic Repeat reQuest (HARQ) transmission.

In some implementations of the present application, the target data do not include data of which at least one segment is being in HARQ transmission.

In some implementations of the present application, the target data do not include first data, and PDCP COUNT of the first data is less than or equal to PDCP COUNT of data that are being in ARQ transmission.

In some implementations of the present application, the target data do not include second data, and PDCP COUNT of the second data is less than or equal to PDCP COUNT of data of which at least one segment is being in ARQ transmission.

In some implementations of the present application, the target data do not include third data, and PDCP COUNT of the third data is less than or equal to PDCP COUNT of data that are being in HARQ transmission.

In some implementations of the present application, the target data do not include fourth data, and the PDCP COUNT of the fourth data is less than or equal to the PDCP COUNT of data which have at least one segment being in an HARQ transmission.

It should be noted that specific implementations of the contents described in the implementation may refer to the above method and will not be described here.

Figure 6:
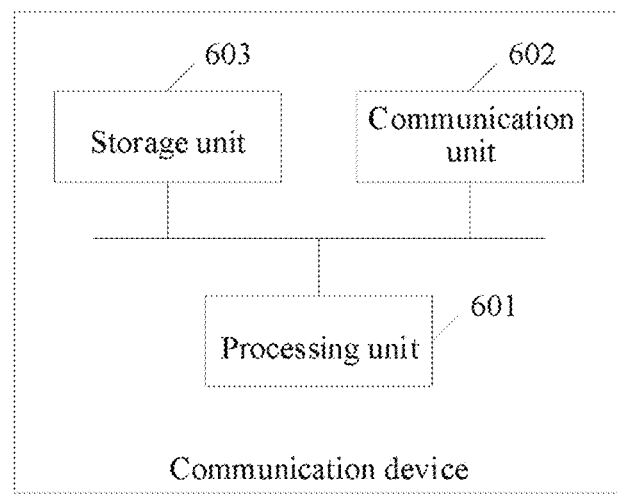
FIG. 6 is a schematic diagram of structure of another communication device according to an implementation of the present application.

Refer to FIG. 6, FIG. 6 is a schematic diagram of structure of a communication device 600 according to an implementation of the present application. The communication device 600 may be user equipment, or a communication device. The communication device 600 is applied to a communication system. The communication system includes a first communication device. The communication device 600 is the first communication device, and the communication device 600 includes a PDCP entity, and the communication device 600 further includes a processing unit 601, a communication unit 602, and a storage unit 603.

The processing unit 601 is used for duplicating target data through the PDCP entity when data duplication is enabled, and the target data do not include data of which transmission has been completed and/or data that are being transmitted; and delivering duplicated target data to an RLC entity through the PDCP entity.

In some implementations of the present application, when the communication device 600 includes user equipment, the user equipment further includes a first RLC entity and a second RLC entity, the first RLC entity is used for transmitting original data and the second RLC entity is used for transmitting duplicated data. In an aspect of delivering the duplicated target data to the RLC entity through the PDCP entity, the processing unit 601 is specifically used for delivering the duplicated target data to the second RLC entity through the PDCP entity.

In some implementations of the present application, the communication system further includes a second communication device, when the first communication device includes a first network device and the second communication device includes a second network device, the first network device further includes an RLC entity, the second network device includes an RLC entity, the RLC entity of the first network device is used for transmitting original data, the RLC entity of the second network device is used for transmitting duplicated data. In an aspect of delivering the duplicated target data to the RLC entity through the PDCP entity, the processing unit 601 is specifically used for delivering the duplicated target data to the RLC entity of the second network device through the PDCP entity.

In some implementations of the present application, the target data do not include data that are being in Automatic Repeat-reQuest (ARQ) transmission.

In some implementations of the present application, the target data do not include data of which at least one segment is being in ARQ transmission.

In some implementations of the present application, the target data do not include data that are in Hybrid Automatic Repeat reQuest (HARQ) transmission.

In some implementations of the present application, the target data do not include data of which at least one segment is being in HARQ transmission.

In some implementations of the present application, the target data do not include first data, and PDCP COUNT of the first data is less than or equal to PDCP COUNT of data that are being in ARQ transmission.

In some implementations of the present application, the target data do not include second data, and PDCP COUNT of the second data is less than or equal to the PDCP COUNT of data of which at least one segment is being in ARQ transmission.

In some implementations of the present application, the target data do not include third data, and PDCP COUNT of the third data is less than or equal to PDCP COUNT of data that are being in HARQ transmission.

In some implementations of the present application, the target data do not include fourth data, and PDCP COUNT of the fourth data is less than or equal to PDCP COUNT of data of which at least one segment is being in HARQ transmission.

The processing unit 601 may be a processor or a controller (e.g., may be a Central Processing Unit (CPU), a general-purpose processor, a Digital Signal Processor (DSP), An Application-Specific Integrated Circuit (ASIC), a Field Programmable Gate Array (FPGA), or other programmable logic device, a transistor logic device, a hardware component, or any combination thereof. The processing unit 601 may implement or execute the various illustrative logical blocks, modules, and circuits described in combination with disclosed contents of the present application. The processor may also be a combination that implements computing functions, e.g., a combination that includes one or more microprocessors, a combination of a DSP and a microprocessor, etc.). The communication unit 602 may be a transceiver, a transceiver circuit, a radio chip, a communication interface, etc., and the storage unit 603 may be a memory.

When the processing unit 601 is a processor, the communication unit 602 is a communication interface, and the storage unit 603 is a memory, the communication device of the implementation of the present application may be the communication device shown in FIG. 5.

An implementation of the present application provides a computer readable storage medium. The computer readable storage medium stores a computer program for electronic data interchange, and the computer program causes a computer to execute parts or all of the acts described for the user equipment in the above method implementations.

An implementation of the present application also provides a computer readable storage medium. The computer readable storage medium stores a computer program for electronic data interchange, and the computer program causes a computer to execute parts or all of the acts described for the network device in the above method implementations.

An implementation of the present application also provides a computer program product. The computer program product includes a non-transitory computer readable storage medium storing a computer program, and the computer program is operable to cause a computer to execute parts or all of the acts described for the user equipment in the above method. The computer program product may be a software installation package.

An implementation of the present application also provides a computer program product. The computer program product includes a non-transitory computer readable storage medium storing a computer program, and the computer program is operable to cause a computer to execute parts or all of the acts described for the network device in the above method implementations. The computer program product may be a software installation package.

The acts of the method or algorithm described in the implementations of the present application may be implemented in hardware or may be implemented by a processor executing software instructions. The software instructions may be composed of corresponding software modules, which may be stored in a Random Access Memory (RAM), a flash memory, a Read Only Memory (ROM), an Erasable Programmable ROM, EPROM), an electrically erasable programmable read-only memory (EEPROM), a register, a hard disk, a mobile hard disk, a read-only optical disk (CD-ROM), or any storage medium in other forms known in the art. An exemplary storage medium is coupled to the processor to cause the processor to be able to read information from the storage medium, and write information to the storage medium. The storage medium may also be a component part of the processor. The processor and the storage medium may be located in an ASIC. In addition, the ASIC may be located in an access network device, a target network device, or a core network device. The processor and the storage medium may also act as separate components in the access network device, the target network device, or the core network device.

Those skilled in the art should realize that in one or more examples described above, the functions described in the implementations of the present application may be implemented in whole or in parts through software, hardware, firmware, or any combination thereof. When the functions described in the implementations of the present application are implemented through software, these functions may be implemented in whole or in parts in the form of a computer program product. The computer program product includes one or more computer instructions. When the computer program instructions are loaded and executed on a computer, the processes or functions are generated in whole or in parts according to the implementations of the present application. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc). The computer-readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The specific implementations described above further explain the purpose, the technical solutions and the beneficial effects of the implementations of the present application in detail. It should be understood that the above is only the specific implementations of the implementations of the present application, and is not used to limit the protection scope of the implementations of the present application. Any modification, equivalent substitution, improvement, etc., made on the basis of the technical solutions of the implementations of the present application shall be included in the protection scope of the implementations of the present application.

What is claimed is:

1. A processing method under data duplication, applied to a communication system, wherein the communication system comprises a first communication device comprising a packet data convergence protocol (PDCP) entity, the method comprises:
   duplicating, by the PDCP entity of the first communication device, target data when data duplication is enabled, wherein the target data do not comprise data of which transmission has been completed, or do not comprise data that are being transmitted, or do not comprise data of which transmission has been completed and data that are being transmitted; and
   delivering, by the PDCP entity of the first communication device, duplicated target data to a radio link control (RLC) entity;
   wherein the target data do not comprise first data, PDCP COUNT of the first data is less than or equal to PDCP COUNT of data that are being in Automatic Repeat-reQuest (ARQ) transmission; or
   wherein the target data do not comprise second data, PDCP COUNT of the second data is less than or equal to PDCP COUNT of data of which at least one segment is being in Automatic Repeat-reQuest (ARQ) transmission; or
   wherein the target data do not comprise third data, PDCP COUNT of the third data is less than or equal to PDCP COUNT of data that are being in Hybrid Automatic Repeat reQuest (HARQ) transmission; or
   wherein the target data do not comprise fourth data, PDCP COUNT of the fourth data is less than or equal to PDCP COUNT of data of which at least one segment is being in Hybrid Automatic Repeat reQuest (HARQ) transmission.

2. The method according to claim 1, wherein when the first communication device comprises user equipment, the user equipment further comprises a first RLC entity and a second RLC entity, the first RLC entity is used for transmitting original data, and the second RLC entity is used for transmitting duplicated data; and delivering, by the PDCP entity of the first communication device, the duplicated target data to the RLC entity comprises:
   delivering, by the PDCP entity of the user equipment, the duplicated target data to the second RLC entity.

3. The method according to claim 1, wherein the communication system further comprises a second communication device, when the first communication device comprises a first network device and the second communication device comprises a second network device, the first network device further comprises an RLC entity, the second network device comprises an RLC entity, the RLC entity of the first network device is used for transmitting original data, the RLC entity of the second network device is used for transmitting duplicated data; delivering, by the PDCP entity of the first communication device, the duplicated target data to the RLC entity comprises:
   delivering, by the PDCP entity of the first network device, the duplicated target data to the RLC entity of the second network device.

4. The method according to claim 1, wherein the target data do not comprise data that are being in Automatic Repeat-reQuest (ARQ) transmission.

5. The method according to claim 1, wherein the target data do not comprise data of which at least one segment is being in Automatic Repeat-reQuest (ARQ) transmission.

6. The method according to claim 1, wherein the target data do not comprise data that are being in Hybrid Automatic Repeat reQuest (HARQ) transmission.

7. The method according to claim 1, wherein the target data do not comprise data of which at least one segment is being in Hybrid Automatic Repeat reQuest (HARQ) transmission.

8. The method of claim 1, wherein whether the data duplication function of the device is disabled or enabled is controlled by a Media Access Control (MAC) Control Element (CE).

9. A communication device, applied to a communication system, wherein the communication system comprises a first communication device, the communication device is the first communication device, the first communication device comprises a packet data convergence protocol (PDCP) entity, and the first communication device further comprises one or more processors, and one or more storages storing one or more programs, wherein: when the one or more programs are executed by the one or more processors, the one or more processors are used for executing acts of:

duplicating target data through the PDCP entity when data duplication is enabled, wherein the target data do not comprise data of which transmission have been completed, or do not comprise data that are being transmitted, or do not comprise data of which transmission has been completed and data that are being transmitted; and delivering duplicated target data to a radio link control (RLC) entity through the PDCP entity;

wherein the target data do not comprise first data, PDCP COUNT of the first data is less than or equal to PDCP COUNT of data that are being in Automatic Repeat-reQuest (ARQ) transmission; or the target data do not comprise second data, PDCP COUNT of the second data is less than or equal to PDCP COUNT of data of which at least one segment is being in ARQ transmission; or wherein the target data do not comprise third data, PDCP COUNT of the third data is less than or equal to PDCP COUNT of data that are being in Hybrid Automatic Repeat reQuest (HARQ) transmission; or the target data do not comprise fourth data, PDCP COUNT of the fourth data is less than or equal to PDCP COUNT of data of which at least one segment is being in HARQ transmission.

10. The communication device according to claim 9, wherein, when the first communication device comprises user equipment, the user equipment further comprises a first RLC entity and a second RLC entity, the first RLC entity is used for transmitting original data and the second RLC entity is used for transmitting duplicated data; the one or more processor are used for executing acts of:

delivering the duplicated target data to the second RLC entity through the PDCP entity.

11. The communication device according to claim 9, wherein the communication system further comprises a second communication device, and when the first communication device comprises a first network device and the second communication device comprises a second network device, the first network device further comprises an RLC entity, the second network device comprises an RLC entity, the RLC entity of the first network device is used for transmitting original data, and the RLC entity of the second network device is used for transmitting duplicated data; the one or more processor are used for executing acts of:

delivering the duplicated target data to the RLC entity of the second network device through the PDCP entity.

12. The communication device according to claim 9, wherein the target data do not comprise data that are being in Automatic Repeat-reQuest (ARQ) transmission, or the target data do not comprise data of which at least one segment is being in ARQ transmission.

13. The communication device according to claim 9, wherein the target data do not comprise data are being in Hybrid Automatic Repeat reQuest (HARQ) transmission, or the target data do not comprise data of which at least one segment is being in HARQ transmission.

14. A communication device comprising one or more processors, one or more storages, one or more transceivers, and one or more programs; wherein the one or more programs are stored in the one or more storages and configured to be executed by the one or more processors, and the one or more programs comprise instructions for executing acts of:

duplicating target data when data duplication is enabled, wherein the target data do not comprise data of which transmission has been completed and/or data that are being transmitted; and delivering duplicated target data to a radio link control (RLC) entity;

wherein the target data do not comprise first data, packet data convergence protocol (PDCP) COUNT of the first data is less than or equal to PDCP COUNT of data that are being in Automatic Repeat-reQuest (ARQ) transmission; or wherein the target data do not comprise second data, PDCP COUNT of the second data is less than or equal to PDCP COUNT of data of which at least one segment is being in Automatic Repeat-reQuest (ARQ) transmission; or wherein the target data do not comprise third data, PDCP COUNT of the third data is less than or equal to PDCP COUNT of data that are being in Hybrid Automatic Repeat reQuest (HARQ) transmission; or wherein the target data do not comprise fourth data, PDCP COUNT of the fourth data is less than or equal to PDCP COUNT of data of which at least one segment is being in Hybrid Automatic Repeat reQuest (HARQ) transmission.

* * * * *